April 17, 1962 P. A. TROUT 3,030,613

TRANSISTOR-CORE FLIP-FLOP MEMORY CIRCUIT

Filed May 15, 1959

INVENTOR.
PHILIP A. TROUT

BY Q. Baxter Warner
[illegible] Hodges
ATTORNEYS.

United States Patent Office 3,030,613

Patented Apr. 17, 1962

3,030,613

TRANSISTOR-CORE FLIP-FLOP MEMORY CIRCUIT

Philip A. Trout, Washington, D.C., assignor to the United States of America as represented by the Secretary of the Navy Filed May 15, 1959, Ser. No. 813,606
6 Claims. (Cl. 340—174)
(Granted under Title 35, U.S. Code (1952), sec. 266)

The invention described herein may be manufactured and used by or for the Government of the United States of America for governmental purposes without the payment of any royalties thereon or therefor.

This invention relates to simple and small power consumption information storage circuits utilizing a pair of junction transistors connected in a flip-flop configuration, and more particularly to such circuits including one or more transistor interconnecting inductances wound on one or more magnetic cores, respectively which exhibit rectangular hysteresis characteristics.

In the past it has been the practice to use continuously operating transistor flip-flop circuits or magnetic core devices with associated pulse driver equipment to perform information storage. These methods have definite disadvantages. For example, in the transistor flip-flop circuits power must be supplied for the duration of time that it is desired to store information, and in the magnetic core devices used in pulse type circuits more complex circuitry is required for simple storage operations.

It is, therefore, an object of this invention to provide a new and improved method of storing information supplied in the form of "on" or "off" electrical signals.

Another object of the invention is to provide a system of the aforementioned character that does not require the continuous application of circuit power and which thusly results in a saving in average power consumption.

A further object is to provide a new method of storage and recovery of information which requires less complex circuitry, and is therefore more reliable and of reduced weight than previous circuits achieving similar results.

Other objects and many of the attendant advantages of this invention will be readily appreciated as the same becomes better understood by reference to the following detailed description when considered in connection with the accompanying drawings wherein:

FIG. 1 discloses a preferred embodiment of a memory circuit of the present invention;

Figure 1:
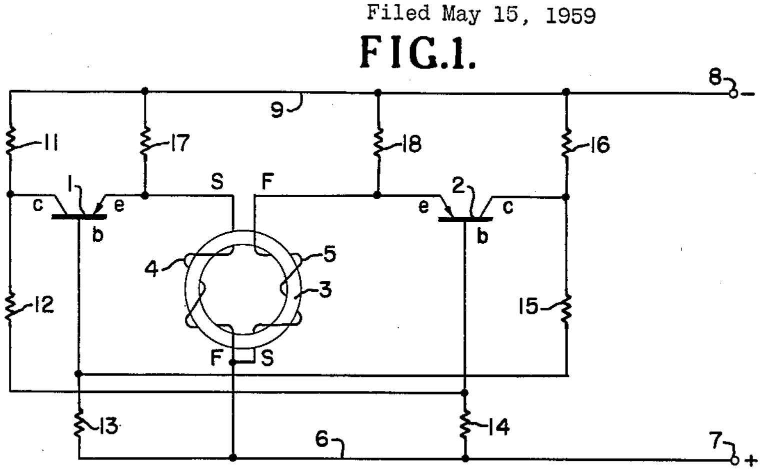

Referring now to the drawings wherein like reference characters represent like or similar elements throughout the several figures, FIG. 1 shows one form of my transistor-core flip-flop memory circuit. Two junction transistors, having base, emitter and collector electrodes, 1 and 2, and resistances 11 through 16, are connected in a flip-flop circuit, combined with a rectangular hysteresis loop type magnetic core 3 of nickle-iron alloy. The core 3 has two equal windings 4 and 5 wound thereon. The emitter of transistor 1 is connected to winding 4 and the emitter of transistor 2 is similarly connected to winding 5. The opposite end of each of the windings 4 and 5 are commonly connected to line 6 which connects with the positive source terminal 7. The symbols F and S are shown to denote the respective ends of each winding. The bases of transistors 1 and 2 are connected through resistances 13 and 14, respectively, to line 6 and hence to terminal 7. The collectors of transistors 1 and 2 are connected through resistances 11 and 16, respectively, to line 9 connected to negative source terminal 8. The transistors are cross-connected by means of resistances 12 and 15, resistance 12 connecting the collector of transistor 1 with the base of transistor 2, and resistance 15 connecting the collector of transistor 2 with the base of transistor 1. Resistance 17 is connected to the junction of winding 4 and the emitter of transistor 1, and resistance 18 is connected to the junction of winding 5 and the emitter of transistor 2. The opposite end of each resistance 17 and 18 is commonly connected to line 9. These two resistance supply bias currents to windings 4 and 5 as will be hereinafter explained in greater detail.

Figure 2:
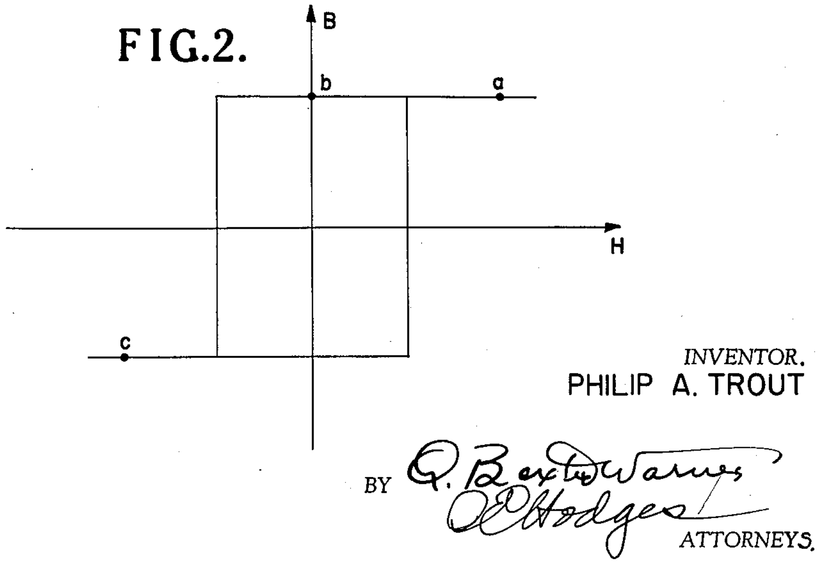
FIG. 2 is a diagram of the operation of the inductance circuit of FIG. 1.

It should be noted that opposing magnetic fields are set up by the currents through each coil. As will now be readily apparent, windings or inductances 4 and 5 are connected in series with the transistor circuit in such a way that the impedance of the core circuit controls, to some extent, the relative amplification of one transistor to the other. During the operation of the circuit one of the two transistors conducts, the other transistor being biased off. Assume, for example, that transistor 1 is conducting. It will draw current through winding 4 magnetizing the core 3 to point "*a*" as shown in FIG. 2. If the flip-flop circuit is now disconnected from the power supply the current drops to zero and the core is left at point "*b*" (FIG. 2). The impedance of a particular winding to an increasing current is proportional to $dB/dH$, the flux change per change of current.

Upon reapplying power, the transistor drawing current through its winding in the direction to change the core magnetization state from point "*b*" to point "*a*" will see a relatively low emitter circuit impedance. This, continuing with the above example, will be transistor 1, the one which had previously been in a conducting condition. Current drawn by transistor 2 through its winding will result in changing the core magnetization state from point "*b*" to point "*c*," producing a relatively high emitter circuit impedance.

The transistor with the lower emitter impedance will have the highest gain, all other factors being equal, and this transistor will turn on first, holding the other transistor in a biased off condition.

In order to obtain the maximum differential in the transistor emitter circuit impedances between the two coils, a bias is applied to the cores by means of resistances 17 and 18. This effectively raises the impedance of the "off" or non-conducting transistor's winding while not changing the "on" or conducting transistor's winding impedance. The operations of the core bias circuit depends on the fact that all of the winding flux is not effective in magnetizing the core. Since the two windings are physically separated on the core, as shown in FIG. 1, the core segment nearest the individual winding will be magnetized chiefly by this winding. The object of this is to place the "off" winding magnetic state nearer the point on the magnetization curve where an abrupt change of magnetization occurs.

The time elapsed between turning the power off and back on does not affect the circuit operation, since the information is stored in the residual magnetization of the core.

The transistor flip-flop is the means by which information is put into storage and for ascertaining what has been previously stored. These operations are similar to conventional flip-flop techniques, for example, information may be put into storage by triggering a transistor base, to turn the transistor on or off. The output may be taken as the collector voltage level, and used to control a gate circuit or the like.

Figure 3:
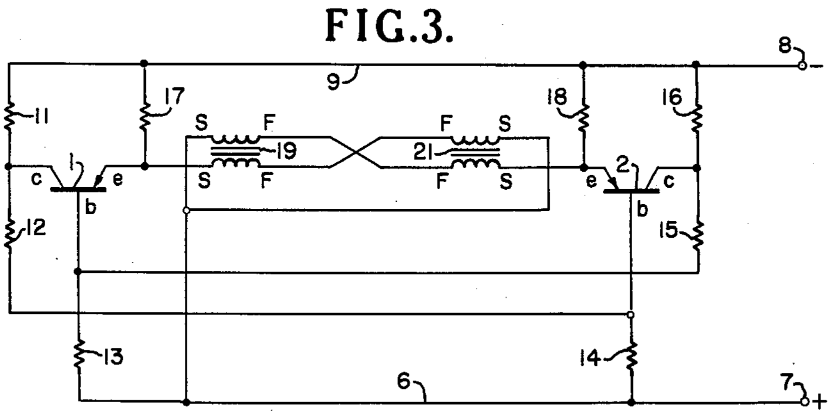
FIG. 3 is an alternative arrangement of the invention.

An alternative method of construction is shown in FIG. 3. In this embodiment two cores 19 and 21 are used with two equal windings on each core connected as shown. The coil and core configuration of each inductance is the same as that shown in FIG. 1, the details being omitted from this figure for simplification. The remainder of the circuit is the same as that of FIG. 1. In this circuit the conducting transistor sets its core in a low impedance region to a turn on current, and sets the second core in a region representing a high impedance to a turn on current. The circuit operation is then similar to that of FIG. 1.

Conventional flip-flop information storage circuits require the continuous application of circuit power to achieve results similar to applicant's novel circuit. Pulse type magnetic core storage circuits require the use of current pulse driver devices for the core to store information as well as an output circuit to determine what information has been stored. Applicant, however, has invented a new and unique storage circuit which results in reduced power consumption and complexity, especially in cases where only a small amount of information is to be stored over a long period of time.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination, a transistor-core flip-flop memory circuit comprising a first transistor and a second transistor each having a base, emitter and collector electrode, a core of material exhibiting rectangular hysteresis loop characteristics for storing information, first and second windings wound on said core, one end of each winding being connected to a first source terminal, the opposite end of each of said first and second windings being connected to the emitter of each of said first and second transistors, respectively, first and second circuit means connecting the collector of each of the first and second transistors, respectively, to a second source terminal, third and fourth circuit means connecting the base of each of said first and second transistors, respectively, to said first source terminal, fifth circuit means connecting the collector of said first transistor with the base of said second transistor, and sixth circuit means connecting the collector of said second transistor with the base of said first transistor.

2. The combination as defined in claim 1 further including a first bias circuit connected from the second source terminal to the emitter of said first transistor, and a second bias circuit connected from said second source terminal to the emitter of said second transistor.

3. A memory circuit comprising a core having a substantially rectangular hysteresis loop, said core having a pair of oppositely wound windings thereon, a power supply, a pair of transistors, a separate resistor connected between the collector of each of said transistors and one terminal of said power supply, first resistor means to connect the collector of each transistor to the base of the other transistor, second resistor means to connect the base of each transistor to the other terminal of said power supply, third resistor means to connect the emitter of each transistor to said one terminal of said power supply, and means to connect the emitter-base circuit of each transistor to a respective one of said windings.

4. A memory circuit comprising a first toroidal-shaped core, a second toroidal-shaped core, first and second windings wound on said first core, third and fourth windings wound on said second core, each of said cores having a substantially rectangular hysteresis characteristic, a bistable trigger circuit having a pair of transistors, means respectively connecting the collector of each of said transistors to the base of the other of said transistors, and means respectively connecting one of said windings on each of said cores in the emitter-base circuit of each of said transistors.

5. The memory circuit of claim 1 wherein the emitter of one of said pair of transistors is connected to the series combination of said first and said second winding, the opposite end of said fourth winding being connected to a source terminal of said trigger circuit, and the emitter of the other of said pair of transistors is connected to the series combination of said third and said second winding, the opposite end of said second winding being connected to said source terminal.

6. The memory circuit of claim 5 further comprising means respectively connected to each of said series combination of said windings for providing biasing currents thereto.

References Cited in the file of this patent

UNITED STATES PATENTS

| | | |
|---|---|---|
| 2,503,039 | Glass | Apr. 4, 1950 |
| 2,760,088 | Pittman et al. | Apr. 21, 1956 |
| 2,774,878 | Jensen | Dec. 18, 1956 |
| 2,785,236 | Bright et al. | Mar. 12, 1957 |
| 2,809,303 | Collins | Oct. 8, 1957 |
| 2,813,976 | Uchrin et al. | Nov. 19, 1957 |
| 2,854,580 | Uchrin et al. | Sept. 30, 1958 |
| 2,874,293 | McMurren | Feb. 17, 1959 |
| 2,875,351 | Collins | Feb. 24, 1959 |
| 2,894,250 | Rochelle et al. | July 7, 1959 |
| 2,903,601 | Schneider | Sept. 8, 1959 |